(12) United States Patent
A

(10) Patent No.: US 10,567,532 B2
(45) Date of Patent: Feb. 18, 2020

(54) CONTACT AVAILABILITY PREDICTION

(71) Applicant: Microsoft Technology Licensing, LLC., Redmond, WA (US)

(72) Inventor: Peer Mohamed Mydeen A, Hyderabad (IN)

(73) Assignee: Microsoft Technology Licensing, LLC, Santa Clara, CA (US)

( * ) Notice: Subject to any disclaimer, the term of this patent is extended or adjusted under 35 U.S.C. 154(b) by 491 days.

(21) Appl. No.: 15/284,436

(22) Filed: Oct. 3, 2016

(65) Prior Publication Data
US 2018/0097899 A1 Apr. 5, 2018

(51) Int. Cl.
*H04L 29/08* (2006.01)
*H04L 12/58* (2006.01)

(52) U.S. Cl.
CPC .......... *H04L 67/24* (2013.01); *H04L 51/043* (2013.01); *H04L 67/22* (2013.01); *H04L 67/303* (2013.01)

(58) Field of Classification Search
CPC .... G06Q 10/10–109; H04L 51/02–043; H04L 51/14; H04L 51/26; H04L 67/22–32; H04L 67/20–24; H04L 67/303–306; H04L 51/043; H04M 3/533
See application file for complete search history.

(56) References Cited

U.S. PATENT DOCUMENTS

| 6,938,213 | B2 | 8/2005 | Brown et al. |
| 7,305,437 | B2 | 12/2007 | Horvitz et al. |
| 7,689,521 | B2 * | 3/2010 | Nodelman ........... G06Q 10/109 706/21 |
| 7,991,721 | B2 | 8/2011 | Gilboa-Freedman et al. |
| 8,346,219 | B1 * | 1/2013 | McMullen ............ H04M 3/533 455/412.1 |
| 8,694,517 | B2 | 4/2014 | Johnsen et al. |
| 8,898,230 | B2 | 11/2014 | O'Sullivan et al. |
| 9,060,050 | B1 | 6/2015 | Chau et al. |
| 9,317,834 | B2 | 4/2016 | Horvitz et al. |

(Continued)

OTHER PUBLICATIONS

"International Search Report and Written Opinion Issued in PCT Application No. PCT/US2017/054642", dated Jan. 5, 2018, 11 Pages.

(Continued)

*Primary Examiner* — Wing F Chan
*Assistant Examiner* — Rajeshwari Krishnan
(74) *Attorney, Agent, or Firm* — Schwegman Lundberg & Woessner, P.A.

(57) ABSTRACT

Contact availability prediction within a messaging service provides users with enhanced tools and services for insights on a contact's availability. Contact availability prediction enhances functionality within a messaging service to predict when a contact will be online or when the contact will be available to communicate. Various types of information about the contacts may be utilized for providing insights on the contact's availability that allow the user to better plan on how to communicate with the contact. For example, telemetry data, including historical availability information and usage information, associated with each user are retrieved and analyzed by the messaging service to produce a model that is used to predict when an unavailable contact will become available, and share those predictions with the user.

20 Claims, 8 Drawing Sheets

(56) References Cited

U.S. PATENT DOCUMENTS

| | | | |
|---|---|---|---|
| 2004/0003042 A1* | 1/2004 | Horvitz | G06Q 10/109 709/204 |
| 2004/0199663 A1 | 10/2004 | Horvitz et al. | |
| 2005/0289470 A1* | 12/2005 | Pabla | G06F 21/41 715/751 |
| 2006/0075091 A1 | 4/2006 | Beyda et al. | |
| 2008/0292079 A1 | 11/2008 | Toutain et al. | |
| 2009/0274286 A1 | 11/2009 | O'Shaughnessy et al. | |
| 2012/0036261 A1 | 2/2012 | Salazar et al. | |
| 2014/0156568 A1* | 6/2014 | Ganguly | G06Q 10/0637 706/12 |
| 2015/0026254 A1 | 1/2015 | Keller et al. | |
| 2015/0052213 A1 | 2/2015 | Kau et al. | |
| 2015/0178626 A1 | 6/2015 | Pielot et al. | |
| 2015/0369705 A1 | 12/2015 | Kruglick | |
| 2016/0241496 A1* | 8/2016 | Cunico | H04L 51/043 |
| 2017/0289076 A1* | 10/2017 | Rife | H04L 51/043 |

OTHER PUBLICATIONS

Danninger, et al., "MyConnector—Analysis of Context Cues to Predict Human Availability for Communication", In Proceedings of the 8th International conference on Multimodal interfaces, Nov. 2, 2006, pp. 12-19.

Hincapié-Ramos, et al., "A Design Space Analysis of Availability-Sharing Systems", In Proceedings of the 24th annual ACM symposium on User interface software and technology, Oct. 16, 2011, pp. 85-95.

* cited by examiner

1. Projecting required telemetry attributes
2. Cleaning Missing data
3. Feature Engineering
4. Training the model
5. Stacking & blending to improve model accuracy
6. Time series analysis Processing & Model Building/Training
170

CONTACT AVAILABILITY PREDICTION

BACKGROUND

People routinely utilize messaging services, such as instant messaging applications, in their daily activities. Indeed, many people utilize these messaging services as a primary medium for communicating with family, friends, coworkers or colleagues. Many of the messaging services even provide additional functionalities, such as voice chat, video chat, document sharing, etc., in order to empower a user to converse with remote persons, hold face-to-face discussions with remote persons, and collaborate on a particular document or project.

Unfortunately, these messaging services only provide a limited amount of information pertaining to a contact's availability. The majority of these messaging applications only provide status information that identifies whether the contact is online or offline. Alternatively, a few of these messaging services may provide additional information that identifies details about the contact's status or how long the contact has been online or offline. However, a user may desire more information about a contact's availability.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage media are provided herein to enable contact availability prediction within a messaging service. Contact availability prediction provides users with enhanced tools and services for insights on the contact's availability. Contact availability prediction provides functionality within a messaging service to predict when a contact will be online or when the contact will be available to communicate. Various types of information about the contacts may be utilized for providing insights on the contact's availability. For example, telemetry data, including historical availability information and usage information, associated with each user are retrieved and analyzed by the messaging service to produce a model that is used to predict when an unavailable contact will become available again.

A user logged into the environment of a messaging service (e.g., WhatsApp® Messenger (offered by WhatsApp, Inc. of Mountain View, Calif.), Facebook® Messenger (offered by Facebook, Inc. of Menlo Park, Calif.), Google Chat™ (offered by Alphabet, Inc. of Mountain View, Calif.), Yahoo!® Messenger (offered by Yahoo, Inc. of Sunnyvale, Calif.), and Skype® (offered by Skype Technologies S.A.R.L. of Luxembourg City, Luxembourg)) will see various contacts who are logged in and available, logged in and unavailable (e.g., "in a meeting", "busy", "do not disturb"), or who are not logged in (and therefore, unavailable). A given user may wait for an unavailable user to become available, but this may be tedious, especially when the unavailable user has not specifically stated at what time they will become available. For example, users in an organization may have work patterns (e.g., different shifts, time zones, holidays, work weeks) and may not know when to expect another user to log into a messaging service. Telemetry data, which include historical usage and availability data for users, are used to create a model which predicts what the likelihood is that an unavailable contact will become available in the environment within the next defined period of time (e.g., one hour, 24 hours, one week, etc.). In various aspects, the availability prediction is presented with a confidence score for how likely a contact will become available in various time periods.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1A:
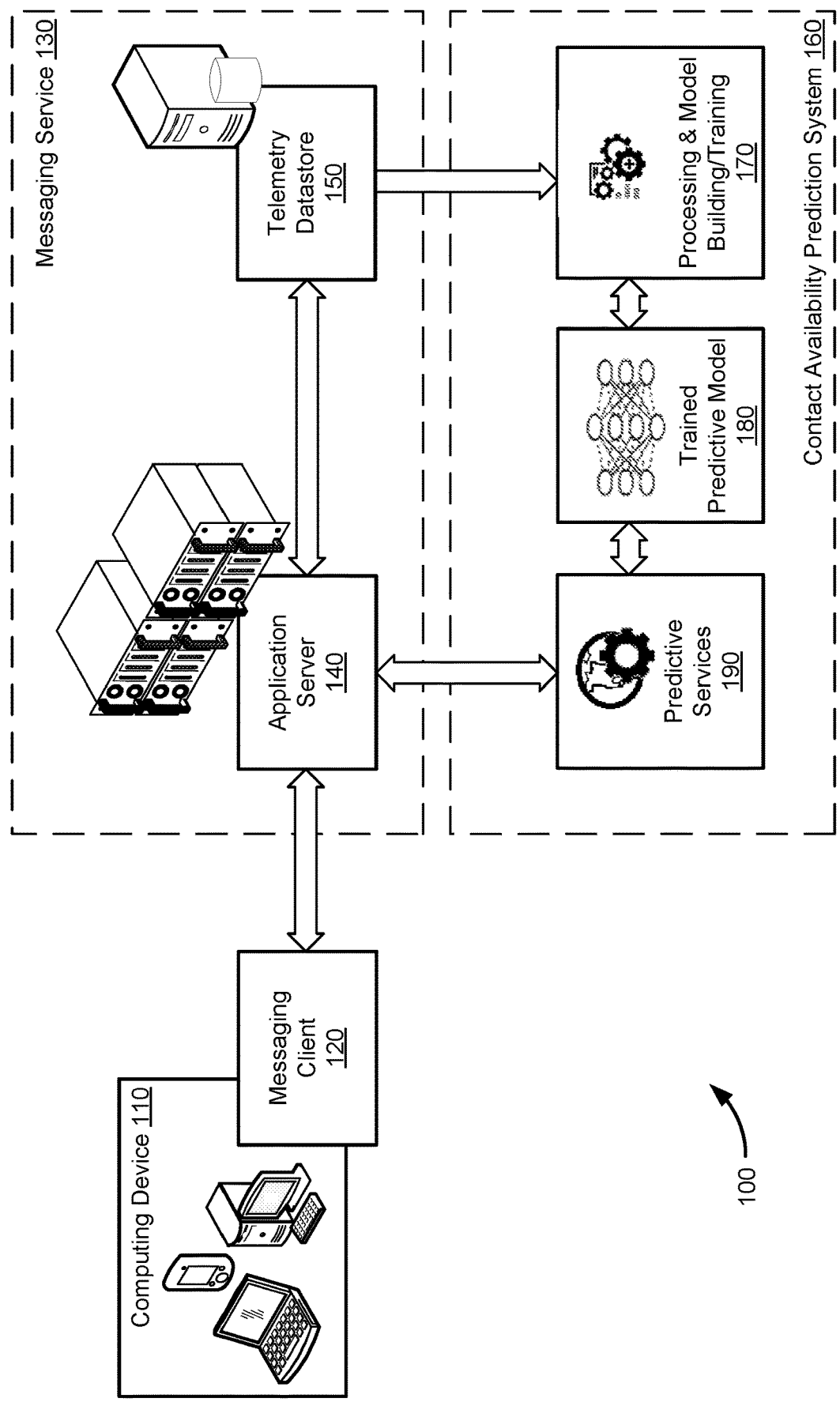
FIG. 1A is an example environment in which contact availability prediction is implemented.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable storage media are provided herein to enable contact availability prediction within a messaging service. Contact availability prediction provides users with enhanced tools and services for insights on the contact's availability. Contact availability prediction provides functionality within a messaging service to predict when a contact will be online or when the contact will be available to communicate. Various types of information about the contacts may be utilized for providing insights on the contact's availability. For example, telemetry data, including historical availability information and usage information, associated with each user are retrieved and analyzed by the messaging service to produce a model that is used to predict when an unavailable contact will become available again.

A user logged into the environment of a messaging service will see various contacts who are logged in and available, logged in and unavailable (e.g., "in a meeting", "busy", "do not disturb"), or who are not logged in (and therefore, unavailable). A given user may wait for an unavailable user to become available, but this may be tedious, especially when the unavailable user has not specifically stated at what time they will become available. For example, users in an organization may have work patterns (e.g., different shifts, time zones, holidays, work weeks) and may not know when to expect another user to log into a messaging service. Telemetry data, which include historical usage and availability data for users, are used to create a model which predicts what the likelihood is that an unavailable contact will become available in the environment within the next defined period of time (e.g., one hour, 24 hours, one week, etc.). In various aspects, the availability prediction is presented with a confidence score for how likely a contact will become available in various time periods.

FIG. 1A is an example environment 100 in which contact availability prediction is implemented. As illustrated, a computing device 110 is running a messaging client 120, which is operable to send messages to another user.

The computing device 110 is illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 4, 5A, 5B, and 6. In various aspects, the computing device 110 is accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The messaging client 120 is illustrative of any client associated with a messaging service used to send and receive messages, including, without limitation, local applications and cloud-based applications, such as WhatsApp® Messenger (offered by WhatsApp, Inc. of Mountain View, Calif.), Facebook® Messenger (offered by Facebook, Inc. of Menlo Park, Calif.), Google Chat™ (offered by Alphabet, Inc. of Mountain View, Calif.), Yahoo!® Messenger (offered by Yahoo, Inc. of Sunnyvale, Calif.), and Skype® (offered by Skype Technologies S.A.R.L. of Luxembourg City, Luxembourg). In various aspects, the messaging service and the recipient's messaging client 120 may be different instances of the same application or program, or they may be unique instances of different applications or programs.

Further, the computing device 110 running the messaging client 120, communicates with a messaging service 130 to send messages to another user via the messaging client 120. Various intermediaries (e.g., networks and servers) may be interposed between the computing device 110 running the messaging client 120 and the message recipient that facilitate the routing of the messages. Additionally, the messaging service 130 communicates status updates to the messaging client 120, including status updates for each of the contacts within the messaging client 120.

The messaging service 130 includes one or more computing devices to provide functionality for communicating messages between messaging clients 120. The one or more computing devices include, without limitation, one or more servers in a cloud service, wired and wireless computing systems, multiprocessor systems, microprocessor-based or programmable consumer electronics, minicomputers, and mainframe computers, which are discussed in greater detail in regard to FIGS. 4, 5A, 5B, and 6. Further, the one or more computing devices are accessed by a network, which may include the Internet, a Local Area Network (LAN), a private distributed network for an entity (e.g., a company, a university, a government agency), a wireless ad hoc network, a Virtual Private Network (VPN), etc.

Further, in the illustrated example, the messaging service 130 includes an application server 140 in communication with a telemetry datastore 150.

The application server 140 facilitates the communication between the messaging clients 120. Further, the application server 140 receives various telemetry data from the messaging clients 120 relating to usage of the messaging client 120. In various aspects, the telemetry data include, but are not limited to: times of login, times of logout, idle time, active time, available time, unavailable time, etc.

The application server 140 communicates the telemetry data to the telemetry datastore 150. The telemetry datastore 150 includes various types of data relating to the messaging service usage. According to aspects, the telemetry datastore 150 includes historical data relating to a person's usage of the messaging service. In one example, the telemetry datastore 150 includes information regarding when a user is online, when a user is offline, how long a user is away on particular days, a user's typical available time, and the average time until the user returns. In another example, the telemetry data includes the user statuses throughout usage of the messaging service, including "away," "be right back," "do not disturb," available, etc. It should also be recognized that the telemetry datastore 150 may include multiple years of historical data.

According to certain aspects, the telemetry datastore 150 employs a multi-temperature data management solution across multiple datastores 150. In one example, the data is organized on the telemetry datastores 150 based on the frequency that data is accessed, such that "hot data," which is accessed frequently, is stored on fast datastores 150, "warm data," which is accessed less frequently, is stored on slightly slower datastores 150, and "cold data," which is accessed rarely, is stored on the slowest datastores 150. Further, the organization of the telemetry data may be prioritized based on the usefulness of the data to provide messaging service usage.

While the telemetry datastore 150 is shown remotely from the application server 140 for illustrative purposes, it should be noted that the telemetry datastore 150 is suitable in several configurations including, without limitation, a separate system hosted by the application server 140, an integral aspect of the application server 140, or a cloud-based remote datastore 150.

Additionally, the messaging service 130 is in communication with a contact availability prediction system 160.

Generally, the contact availability prediction system 160 is configured to utilize the telemetry datastore 150 to provide predictions of user availability. In the illustrated example, the contact availability prediction system 160 includes aspects for processing and model building/training, trained predictive models, and predictive model services. It should also be recognized that functionalities of the contact availability prediction system 160, including functionalities for the processing and model building/training module 170, trained predictive model module 180, and predictive services module 190, are suitable in other configurations including, without limitation, as single module, or in multiple modules.

According to aspects, the processing and model building/training module 170 utilizes data from the telemetry datastore 150 to generate functionality for predicting user availability. In the illustrated example, the processing and model building/training module 170 retrieves data from the telemetry datastore 150, performs processing, and builds a predictive model. More particularly, the processing and model building/training module 170 retrieves the telemetry data and identifies attributes from the telemetry data, which are indicative of a user's availability. For example, the relevant attributes may include online/offline metrics, login/logoff times, user statuses, away times, away lengths, etc.

After identifying attributes from the telemetry data, the processing and model building/training module 170 cleanses the telemetry data. In one example, the processing and model building/training module 170 removes any unnecessary telemetry data, thereby isolating a subset of the telemetry data that is pertinent to building the predictive model. In other examples, the processing and model building/training module 170 cleanses the telemetry data of any confidential, private or sensitive information. In yet other examples, the processing and model building/training module 170 cleanses incomplete telemetry data by ignoring or removing entries, which have missing attributes (e.g., due to data loss) from the dataset.

Figure 1B:
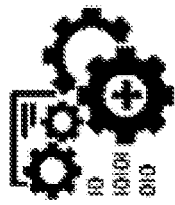
FIG. 1B is a detailed example of the process and model building/training aspect illustrated in FIG. 1A.

The cleansed telemetry data is transformed by the processing and model building/training module 170 for further processing. For example, the telemetry data may be formatted into digestible information. In another example, the processing and model building/training module 170 generates categories based on the telemetry data. FIG. 1B illustrates one example of aspects of the processing and model building/training module 170. According to aspects, the processing and model building/training module 170 illustrates an example method for data ingestion, data cleansing, data transformation, model building and model testing. More specifically, FIG. 1B illustrates these steps including (1) projecting require telemetry attributes, (2) cleaning missing data, (3) feature engineering, (4) training the model, (5) stacking and blending to improve model accuracy, and (6) time series analysis.

According to certain examples, the processing and model building/training module 170 normalizes the transformed telemetry data. For example, in one example, the processing and model building/training module 170 performs feature hashing of the transformed telemetry data. The feature hashing further refines the telemetry data based on the system's functionality. For example, if the system is unable to process strings, the feature hashing converts the strings into hash values that are identifiable by the processing and model building/training module 170. It should also be recognized that other types of feature hashing may be utilized on the telemetry data.

Further, the processing and model building/training module 170 performs feature selection on the telemetry data. In one example, the processing and model building/training module 170 utilizes one or more features operable to perform a correlation on each attribute of the telemetry data. This allows the telemetry data to be correlated based on a particular attribute. For example, the telemetry data may be correlated based on a particular field.

The processing and model building/training module 170 uses the telemetry data to build a predictive model. In one example, the predictive model builds multiple models.

According to some aspects, the processing and model building/training module 170 uses a portion of the transformed data for building the predictive model. For example, the processing and model building/training module 170 splits the telemetry data into multiple portions. One portion of the telemetry data is utilized in building the predictive model while other portions of the telemetry data are utilized in training the predictive model.

Once the predictive model is built, the contact availability prediction system 160 utilizes the processing and model building/training module 170 to train the predictive model. As discussed above, according to certain aspects, the other portions of the telemetry data are utilized in testing/training the predictive model. In one example, the processing and model building/training module 170 utilizes one or more predictive analytics in training the predictive model. Further, the processing and model building/training module 170 may train the predictive model based on one or more attributes of the telemetry data. According to another aspect, when multiple predictive analytics are used in training the predictive model, the processing and model building/training module 170 blends the different models into a single predictive model. It should also be noted, that the processing and model building/training module 170 continues to train the predictive model based on new telemetry data. Thereby ensuring that the predictive model continues to be applicable to the most recent user behavior.

The trained predictive model 180 is illustrative of the predictive model resulting from the processing and model building/training module 170. Furthermore, the trained predictive model 180 may output or partially output model information to the processing and model building/training module 170, which may include one or more iterations of feedback. The trained predictive model 180 provides the predictive results in response to receiving an input. Further, the trained predictive model 180 may provide results based on a weighted average. For example, in response to receiving a query, the trained predictive model 180 may generate multiple predictions regarding the user's predicted availability. In response to generating multiple predictions, the trained predictive model 180 may present the result as a weighted average. In another example, the trained predictive model 180 provides a confidence score associated with the prediction based on the differences with the multiple predictions.

The contact availability prediction system 160 exposes the predictive services module 190 to the messaging service 130. According to one aspect, the predictive services module 190 provides an interface through which the messaging service 130 interacts (e.g., sending a parameter, receiving a predicted availability, etc.) with the trained predictive model 180. For example, when the user starts the messaging client 120, the messaging client 120 communicates with the application server 140. The application server 140 communicates each of the contacts to the predictive services module 190. In response to receiving a first contact, the predictive services module 190 communicates the first contact to the trained predictive model 180 for calculation of the contact's predicted availability. The trained predictive model 180 calculates the contact's predicted availability and communicates the contact's predicted availability to the predictive services module 190. The predictive services module 190 may also provide a confidence level associated with the contacts predicted availability. The contact's predicted availability is thereafter communicated to the application server 140 and finally the messaging client 120.

According to certain aspects, the messaging service 130 implements one or more privacy safeguards against disclosing the user's predicted availability. In one example, the messaging service 130 includes customizable privacy settings that allow the predicted availability feature to be enabled or disabled. In another example, the privacy settings include functionality to enable or disable the predicted availability feature for a particular group of users, such as contacts within the messaging service 130. In yet another example, the privacy settings may be configured when a contact is added to the user's contact list.

Figure 2:
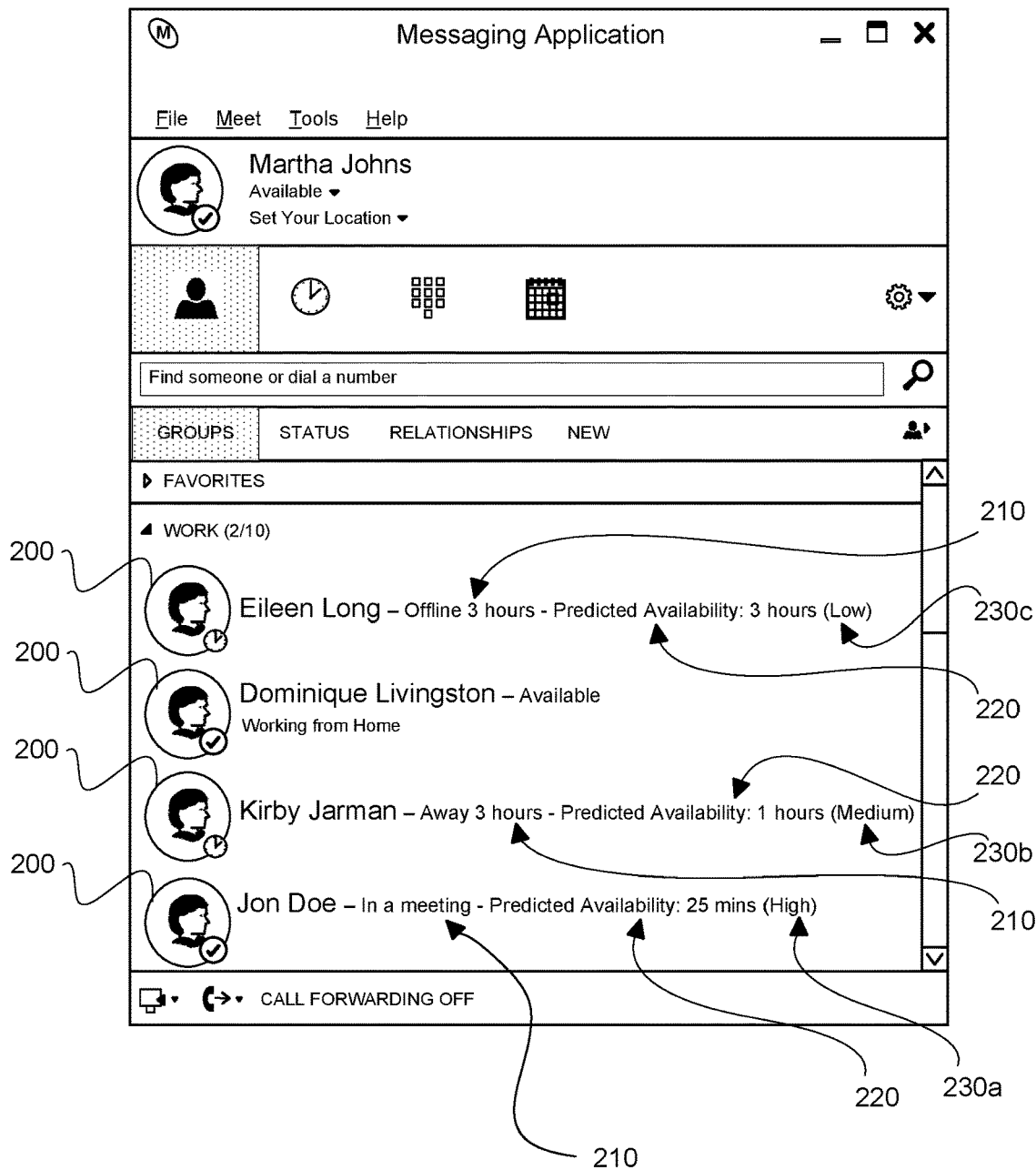
FIG. 2 is an illustration of an example graphical user interface in which contact availability prediction is implemented.

FIG. 2 is an illustration of an example messaging client 120 in which contact availability prediction is implemented. In the illustrated messaging client 120, the graphical user interface includes various controls for initiating functionality associated with the messaging service 130.

The messaging client 120 illustrates a list of the user's contacts that also utilize the messaging service 130. The messaging client 120 includes an icon 200 (e.g., an avatar, photo, or datagram) associated with the contact in various aspects. Further, the icon 200 may provide additional overlay icons or features that identify whether the user is online, away, or offline. Further, additional status information about the contacts may be provided for display in the messaging client 120 to provide additional details about the contact, such as, for example, user defined status messages like "working from home", "on the road", "mobile connection", etc.

For contacts who are unavailable, either who are not logged in or are displaying a status marking them as unavailable via the messaging service 130, an unavailability status marker 210 is displayed explaining why the individual user is determined to be unavailable. For example, a user who is not logged into the messaging service 130 may be associated in the messaging client 120 with a status marker 210 as "offline", a user who has not been detected as active via the message service 130 (e.g., no keyboard input for X minutes) may be associated in the messaging client 120 with a status marker 210 of "away" or "idle", and a user who is detected as in a meeting or otherwise not to be disturbed by the messaging service 130 (e.g., by an integrated calendar application, manual selection of an unavailable status) may be associated in the messaging client 120 with a status marker 210 or "busy", "in a meeting", or "do not disturb". As will be appreciated, other status markers 210 are possible and the foregoing has been presented as non-limiting examples.

The contact availability prediction service 160 provides the messaging service 130 with predictions on when contacts that are currently unavailable will become available. In various aspects, these predictions are displayed in the messaging client 120 as prediction markers 220 and confidence markers 230 that display or are based on an analysis of various telemetry data.

Prediction markers 220 display to the local user of the messaging client 120 when a contact is expected to be available via the messaging service 130. In various aspects, the time indicated by the prediction marker 220 may be the first time that exceeds a confidence score for the contact to become available again, while in other aspects, the time indicated may be bound by a user-defined time period (e.g., the end of the workday).

The confidence markers 230 indicate the reliability of the prediction displayed in the prediction marker 200 as estimated by the contact availability prediction system 160. In various aspects, confidence markers 230 are presented in multiple categories for various thresholds of confidence, such as, for example, a high confidence marker 230a, a medium confidence marker 230b, and a low confidence marker 230c. For example, a contact presented in association with a low confidence marker 230c may be associated with a trained predictive model 180 that has been trained with less telemetry data than a contact who is presented in association with a medium confidence marker 230b or a high confidence marker 230a as the contact availability prediction system 160 is less confident in the model used to generate the prediction of that contact's availability.

In additional aspects, the local user may specify various time frames (e.g., 1 hour from now, 2 hours from now, within my remaining workday) to receive a prediction of the contact becoming available again. In these aspects, the prediction marker 220 displays the specified time frame and the confidence marker 230 displays the likelihood, as determined by contact availability prediction system 160, that the given contact will become available by or before that timeframe.

By displaying to the local user the predicted availabilities of the contacts in a messaging client 120, the local user is enabled to better plan on how to communicate with the currently unavailable contact. For example, a local user may elect to wait for a contact that is unavailable to become available again in the messaging service 130 when a high confidence prediction with a low time until availability is presented, but may elect to send an email or leave a voice mail message when a low confidence prediction or a high confidence prediction with a high time until availability is presented. The contact availability prediction system 160 thus increases the utility of the messaging system, and thereby improves the functionality of the computing device 110 on which the messaging client 120 is run.

Figure 3:
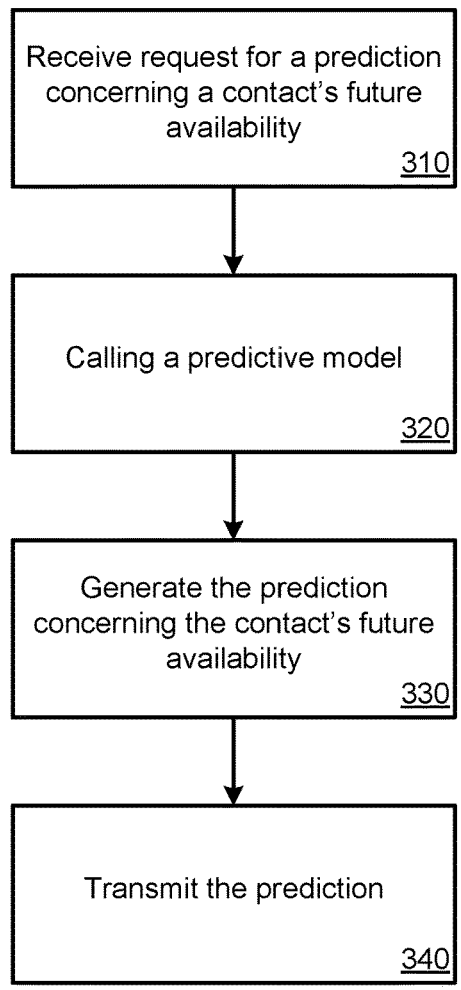
FIG. 3 is a flow chart showing general stages involved in an example method for providing contact availability prediction.

FIG. 3 is a flow chart showing general stages involved in an example method 300 for providing contact availability prediction.

The method 300 begins at OPERATION 310, where the contact availability prediction system 160 receives a communication from the messaging service 130. The communication requests a prediction concerning a future availability of a contact or user of the messaging service 130. More specifically, in one example, the communication includes a parameter that identifies a particular user, such as, for example, a username, email address, or other personal identifier for the user.

The method 300 proceeds to OPERATION 320, where the contact availability prediction system 160 calls a predictive model that is utilizing telemetry data from the messaging service 130. The telemetry data including details relating to usage of the messaging service 130 by the contact/user. In one example, the telemetry data include information concerning historical usage of the messaging service 130 by the contact/user. In another example, the telemetry data indicate when a user is online, when a user is offline, how long a user is away on particular days, a user's typical available time, and the average time until the user returns. In yet another example, the telemetry data include information concerning the user statuses throughout the use of the messaging service 130.

The method 300 proceeds to OPERATION 330, where the contact availability prediction system 160 generates the prediction concerning the future availability of the contact based on the telemetry data. In one example, a predictive model is utilized for generating the availability prediction. In another example, the predictive model produces one or more confidence scores for the availability of the contact within various time ranges (e.g., x % confident in available within 1 hour, y % confident in available within 2 hours, z % confident in available within 24 hours). In yet another example, the predictive model provides a first time that exceeds a threshold confidence for the contact becoming available. For example, with a confidence threshold of 51% and a contact with 5%, 60%, and 99% confidence scores for becoming available within X, Y, and Z hours respectively, the first time that the contact availability prediction system 160 expects the contact to be available may be returned as Y hours or a linear (or other) regression to produce a time between X and Y hours equivalent to 51% confidence of the contact's availability.

The method 300 proceeds to OPERATION 340, where the contact availability prediction system 160 transmits the prediction concerning the future availability of the contact to the messaging service 130 for display on a messaging client 120. In various aspects, the prediction transmitted for display on a messaging client includes confidence score or an expected first time of availability based on a confidence threshold.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
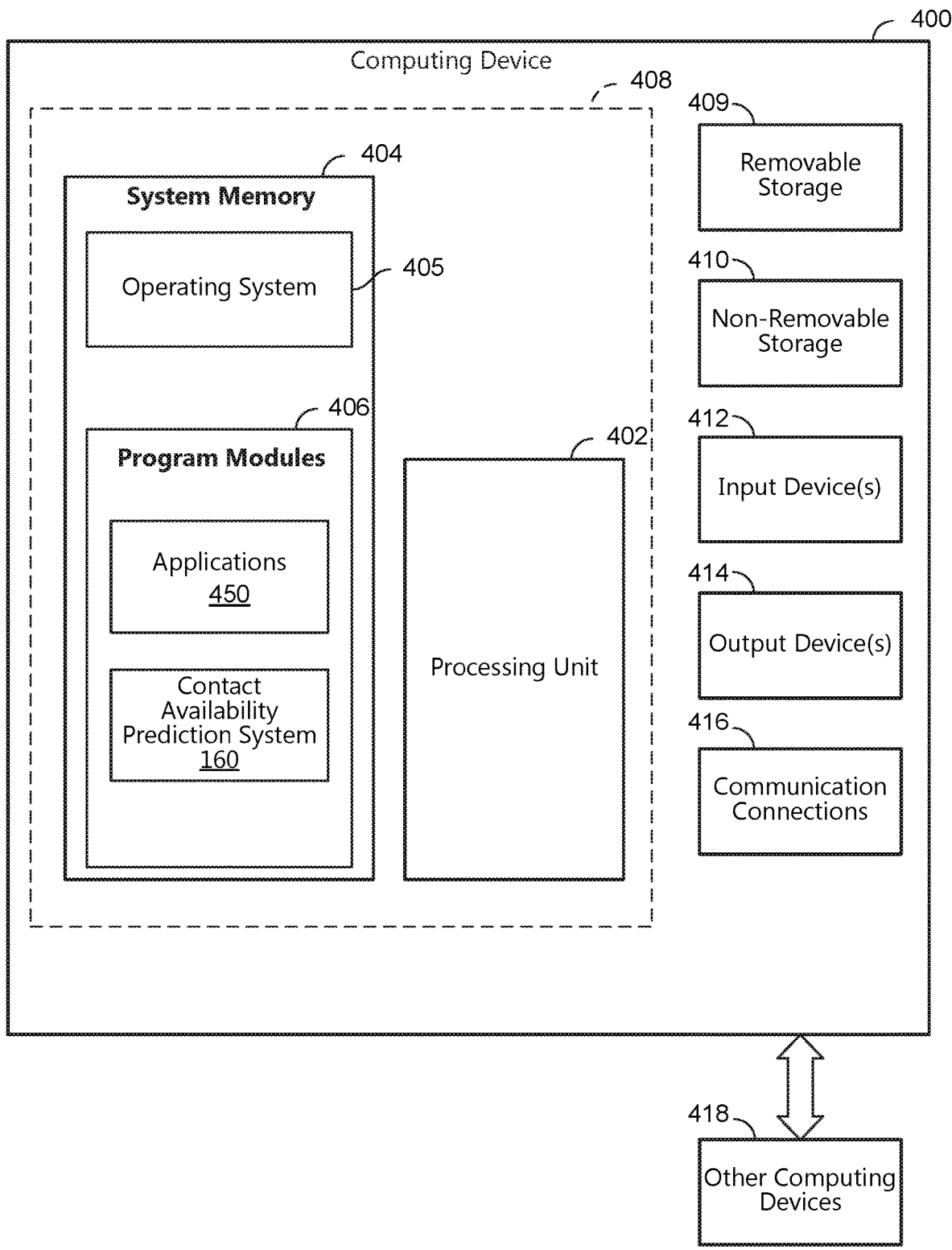
FIG. 4 is a block diagram illustrating example physical components of a computing device.
Figure 5A:
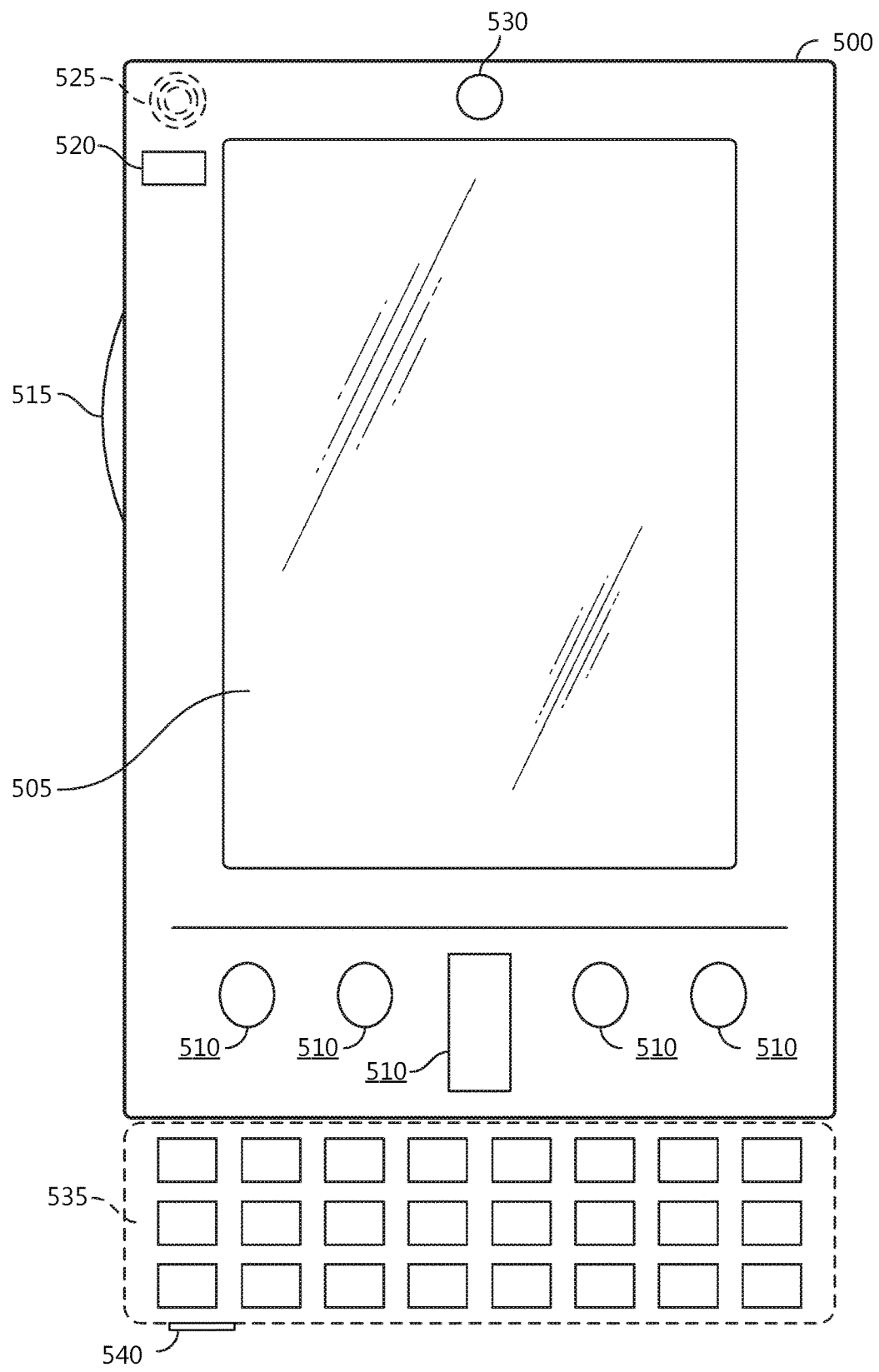
FIGS. 5A and 5B are block diagrams of a mobile computing device.
Figure 5B:
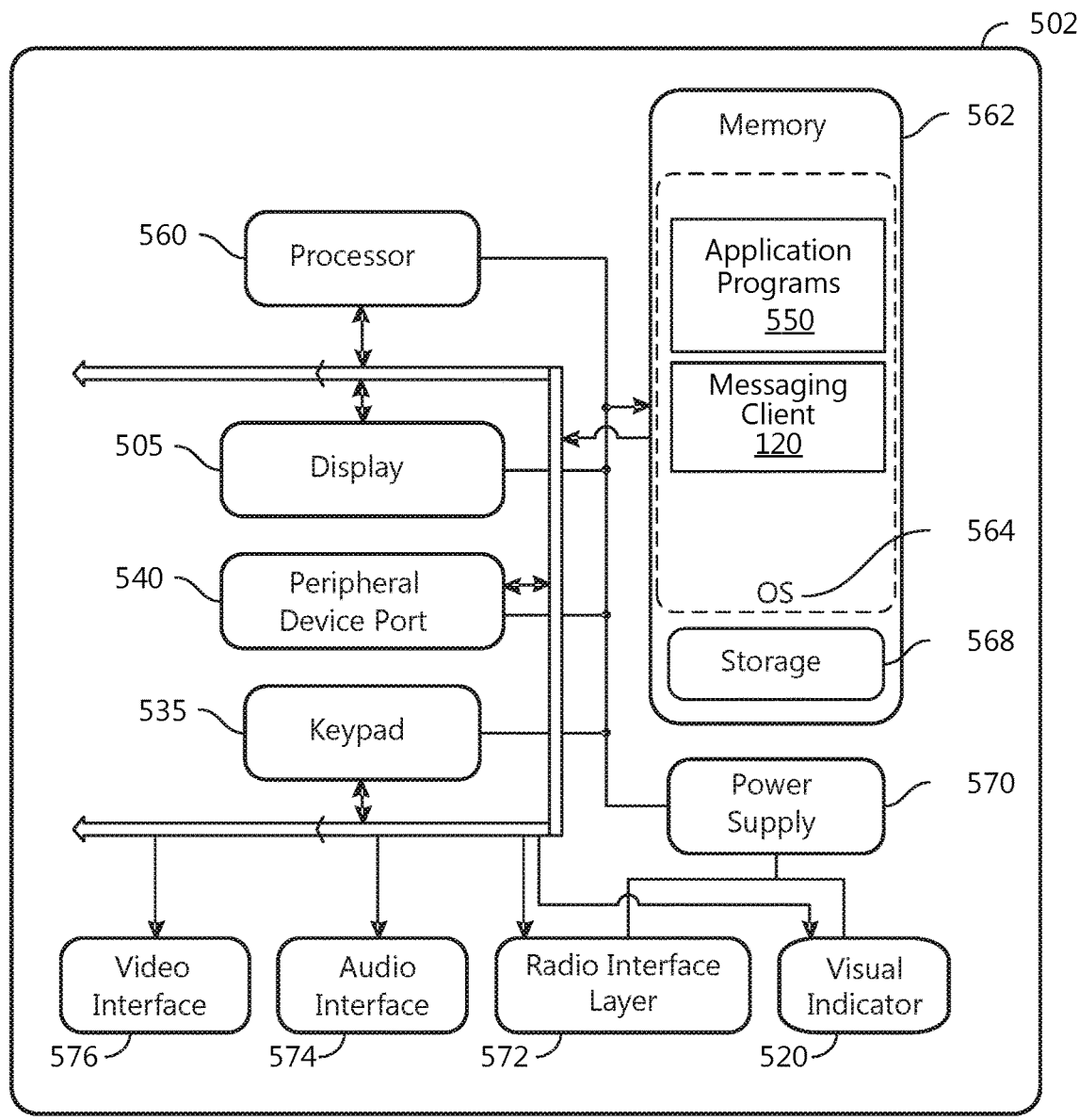
Figure 6:
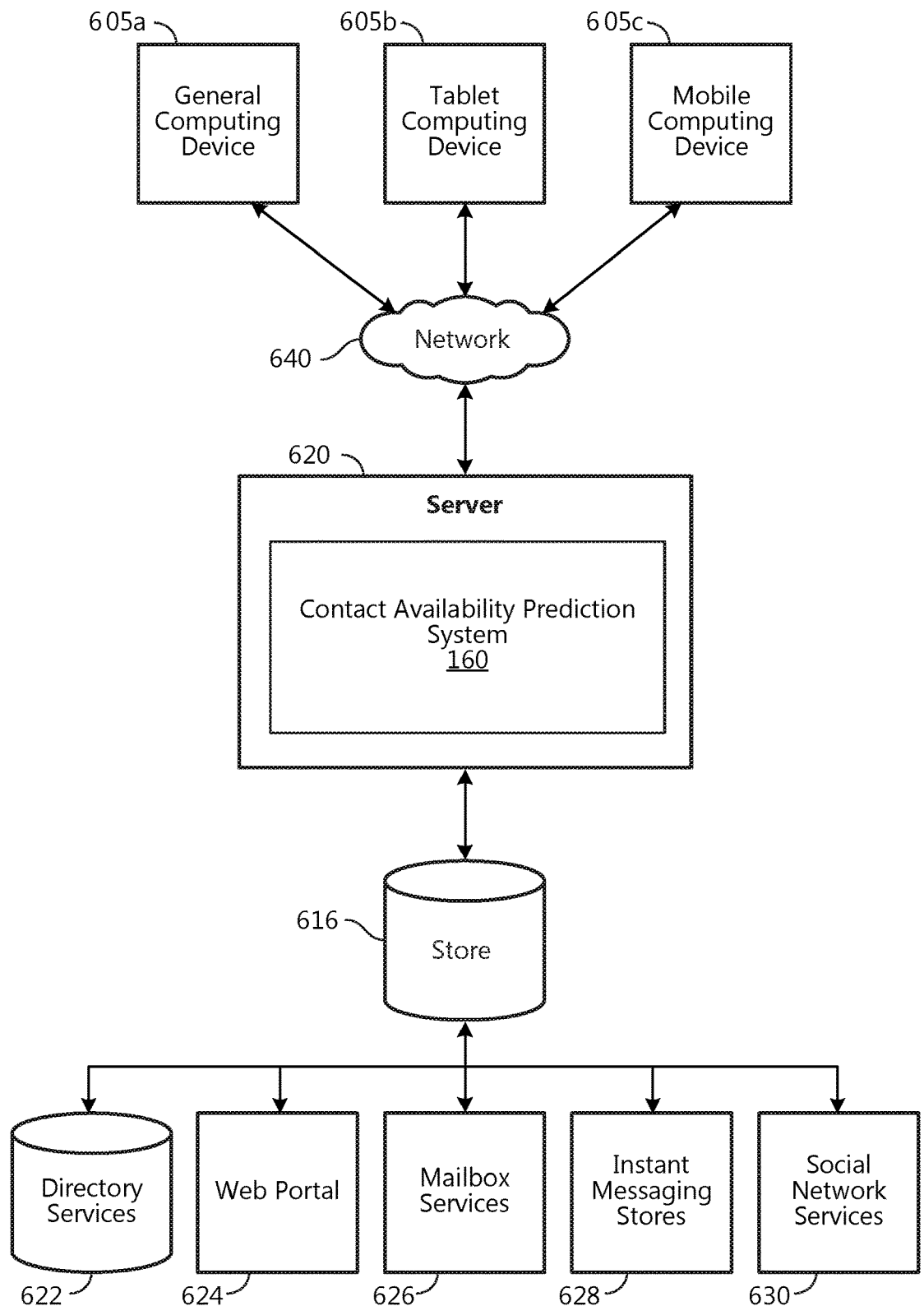
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the contact availability prediction system 160. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., the contact availability prediction system 160) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, a messaging client 120 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for providing contact availability prediction as described above. Content developed, interacted with, or edited in association with the contact availability prediction system 160 is enabled to be stored in different communication channels or other storage types. For example, various documents may be stored using a directory service 622, a web portal 624, a mailbox service 626, an instant messaging store 628, or a social networking site 630. The contact availability prediction system 160 is operative to use any of these types of systems or the like for providing contact availability prediction, as described herein. According to an aspect, a server 620 provides the contact availability prediction system 160 to clients 605a,b,c. As one example, the server 620 is a web server providing the contact availability prediction system 160 over the web. The server 620 provides the contact availability prediction system 160 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for providing a prediction of a future availability of a contact, comprising:
    retrieving telemetry data from a messaging service, wherein the telemetry data relates to usage of the messaging service by the contact;
    generating one or more predictions of future availability of the contact based on the telemetry data, each prediction identifying a respective time period when the contact is next available and a respective confidence score indicating a likelihood that the contact will be available within the respective time period;
    selecting one of the generated predictions of future availability of the contact based on the respective confidence score; and
    transmitting the selected prediction of future availability of the contact to the messaging service for display on a messaging client.

2. The method of claim 1, wherein the telemetry data includes information concerning historical usage of the messaging service by the contact.

3. The method of claim 1, wherein the telemetry data includes information indicating when a user is online, when the user is offline, how long the user is away on particular days, the user's typical available time, and an average time until the user returns.

4. The method of claim 1, wherein the telemetry data includes times of login, times of logout, and idle time.

5. The method of claim 1, wherein the request for the prediction concerning the future availability of the contact further comprises a parameter that identifies the contact.

6. The method of claim 1, wherein the respective time period and the respective confidence score of the selected prediction are displayed on the messaging client.

7. The method of claim 1, further comprising:
utilizing a predictive model to generate the prediction concerning the future availability of the contact, wherein the predictive model is continually trained based on new telemetry data retrieved from the messaging service; and
the transmitted selected prediction includes the respective confidence score of the selected prediction.

8. A system for providing a prediction of a future availability of a contact, comprising:
a processing unit; and
a memory including computer readable instructions, which when executed by the processing unit, causes the system to be operable to:
retrieve telemetry data from a messaging service, wherein the telemetry data relates to usage of the messaging service by the contact;
generate one or more predictions of future availability of the contact based on the telemetry data, each prediction identifying a respective time period when the contact is next available and a respective confidence score indicating a likelihood that the contact will be available within the respective time period;
select one of the generated one or more predictions of future availability of the contact based on the respective confidence score; and
transmit the selected prediction of future availability of the contact to the messaging service for display on a messaging client.

9. The system of claim 8, wherein the telemetry data includes information concerning historical usage of the messaging service by the contact.

10. The system of claim 8, wherein the telemetry data includes information indicating when a user is online, when the user is offline, how long the user is away on particular days, the user's typical available time, and an average time until the user returns.

11. The system of claim 8, wherein the telemetry data includes times of login, times of logout, and idle time.

12. The system of claim 8, wherein the request for the prediction concerning the future availability of the contact further comprises a parameter that identifies the contact.

13. The system of claim 8, wherein the respective time period and the respective confidence score of the selected prediction are displayed on the messaging client.

14. The system of claim 8, wherein the system is further operable to:
utilize a predictive model to generate the prediction concerning the future availability of the contact, wherein predictive model is continually trained based on new telemetry data retrieved from the messaging service; and
the transmitted selected prediction includes the respective confidence score of the selected prediction.

15. A computer readable storage device including computer readable instructions, which when executed by a processing unit, performs steps for providing a prediction of a future availability of a contact, comprising:
retrieving telemetry data from a messaging service, wherein the telemetry data relates to usage of the messaging service by the contact;
generating a predictive model based on the telemetry data;
generating one or more predictions of future availability of the contact based on results of the predictive model, each prediction identifying a respective time period when the contact is next available and a respective confidence score indicating a likelihood that the contact will be available within the respective time period;
selecting one of the generated one or more predictions of future availability of the contact based on the respective confidence score; and
transmitting the selected prediction of future availability of the contact to the messaging service for display on a messaging client.

16. The computer readable storage device of claim 15, wherein the telemetry data includes information concerning historical usage of the messaging service by the contact.

17. The computer readable storage device of claim 15, wherein the telemetry data includes information indicating when a user is online, when the user is offline, how long the user is away on particular days, the user's typical available time, and an average time until the user returns.

18. The computer readable storage device of claim 15, wherein the telemetry data includes times of login, times of logout, and idle time.

19. The computer readable storage device of claim 15, wherein the request for the prediction concerning the future availability of the contact further comprises a parameter that identifies the contact.

20. The computer readable storage device of claim 15, further comprising:
the predictive model is continually trained based on new telemetry data retrieved from the messaging service; and
the transmitted selected prediction includes the respective confidence score of the selected prediction.

* * * * *